United States Patent [19]

Phillips et al.

[11] Patent Number: 4,599,552
[45] Date of Patent: Jul. 8, 1986

[54] GENERATOR VOLTAGE REGULATOR

[75] Inventors: Graham R. Phillips, St. Louis; Vietson M. Nguyen, Florissant, both of Mo.

[73] Assignee: Century Electric, Inc., St. Louis, Mo.

[21] Appl. No.: 648,721

[22] Filed: Sep. 7, 1984

[51] Int. Cl.⁴ ............................................. H02J 7/14
[52] U.S. Cl. ...................................... 322/28; 320/64; 322/60; 322/73
[58] Field of Search ...................... 322/28, 59, 60, 73; 320/64, 68

[56] References Cited

U.S. PATENT DOCUMENTS

| | | | |
|---|---|---|---|
| 3,374,417 | 3/1968 | Trower | 322/28 |
| 3,548,288 | 12/1970 | Wyles | 322/60 X |
| 3,599,080 | 8/1971 | Bennett | 322/60 X |
| 3,611,112 | 10/1971 | Lehinhoff | 322/60 X |
| 3,697,859 | 10/1972 | Nordbrock | 322/28 |
| 3,775,666 | 11/1973 | Smith | 322/28 |
| 3,982,169 | 9/1976 | Cummins | 322/60 X |
| 4,362,983 | 12/1982 | Mori et al. | 322/60 X |
| 4,409,539 | 10/1983 | Nordbrock et al. | 322/60 X |
| 4,525,662 | 6/1985 | Kato et al. | 322/28 |

OTHER PUBLICATIONS

Century Electric Co.—Regulator with Series Boost and Manual Control, 09/08/75, Drawing Number 404752.
Century Electric Co.—Schematic/Wiring Diagram PMG Excitation with Test Points, 01/11/78, Drawing Number 405128.
Century Electric Co.—Schematic/Wiring Diagram ARCB Generator, 10/30/70, Drawing Number 403979.
Century Electric Co.—Wiring Diagram, 10/07/69, Drawing Number 403916.

*Primary Examiner*—R. J. Hickey
*Attorney, Agent, or Firm*—Rogers, Howell, Moore & Haferkamp

[57] ABSTRACT

A voltage regulator circuit for a three phase AC generator includes an integrator circuit which integrates the voltage across each negative half cycle of generator output and compares it to a reference voltage to adjust the phase angle of an SCR circuit which provides the power to the exciter field of the generator. A bypass circuit is provided for bypassing the regulating circuit at low generator speeds, the bypass circuit including a FET which directly connects the anode and gate of the SCR in the exciter field power supply to directly apply the generator output voltage to the exciter field at low generator speeds and output voltage. A pair of transistors are latched as the output voltage reaches a preselected minimum value to de-energize the FET and enable the regulator circuit to take over control.

19 Claims, 2 Drawing Figures ial voltage ofof either single phase or three phase. A typical

GENERATOR VOLTAGE REGULATOR

BACKGROUND AND SUMMARY

Alternating current generators are well-known in the art and are used to produce alternating current output voltages of either single phase or three phase. A typical three phase AC generator of the rotating field type has field coils excited by an exciter coil on the same shaft. The exciter field excites the exciter armature, the output of which is rectified and used to excite the generator field which when rotated induces an AC voltage in the generator stator.

The DC voltage applied to the exciter field controls the exciter field strength which in turn controls the exciter armature voltage and, hence, the main field magnetic strength. As the main field magnetic strength is controlled, so is the generator output voltage induced in the generator stator.

Also well-known in the art are voltage regulator circuits which are connected to the output voltage leads from the generator stator and which control the voltage applied to the exciter field to control the strength of the main field to adjust the output voltage. Many different techniques are used to sample or sense the output voltage, one of which the inventors are familiar with includes detecting the peak of every other half cycle of the output voltage, comparing it with a desired reference value, and then adjusting the exciter field voltage up or down as required to correct the generator output voltage.

Another problem associated with utilizing voltage regulators which detect generator output and compare generator output voltage with a reference voltage is that a way must be found to bypass this regulator circuit during start up as the generator comes up to speed. Until the generator output voltage has reached a minimum value, it is desirable to energize the exciter field with full voltage to rapidly increase the output voltage to the generator's rated value. Once a minimum output voltage is reached, it is desired to switch control of the exciter voltage to the regulator circuits for controlled energization of the exciter field and output voltage.

To solve these design problems the inventors herein have succeeded in developing a unique and novel regulator circuit which integrates each half cycle of the output voltage, compares that integrated value to a reference voltage, and switches an SCR in the exciter field voltage supply at the proper phase angle to apply a voltage to the exciter field of the proper amount to regulate the output voltage. An operational amplifier and a feedback capacitor are used to integrate the output voltage during each negative half cycle. The integrated voltage on the capacitor is discharged through a resistor and is compared with a reference voltage by a differential amplifier which compares the two voltages and triggers a pulse generator at that point in the voltage decay when the values equalize. The pulse generator generates a pulse to trigger the SCR controlled field exciter voltage supply, and also resets the voltage on the capacitor for the next half cycle.

In addition to the regulator circuit, the inventors have designed a bypass circuit which latches on the SCR in the field exciter voltage supply to permit the low residual voltage of the generator to be directly coupled to the exciter field for maximum energization during start up. After the output voltage reaches a minimum preselected value, this bypass circuitry is latched out by a pair of transistors, and the voltage regulator circuits previously described take over during normal running conditions.

While the foregoing has been a brief description of the main advantages of the inventors' new design, the entire invention may be more fully understood by referring to the drawing and the description of the preferred embodiment which follows.

DETAILED DESCRIPTION OF THE PREFERRED EMBODIMENT

Figure 1A:
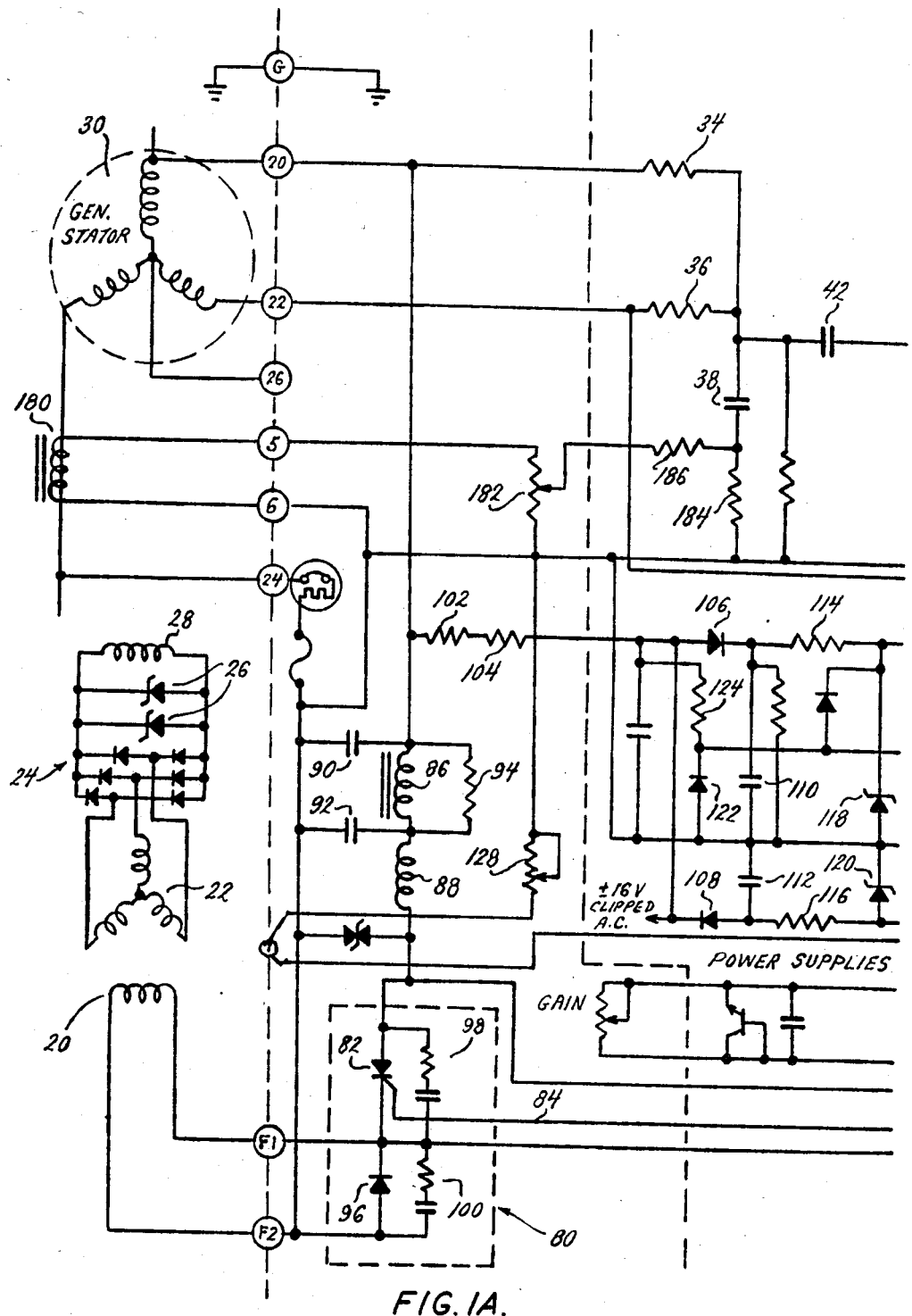
FIG. 1A-B is an electrical schematic of the voltage regulator circuit of the present invention.
Figure 1B:
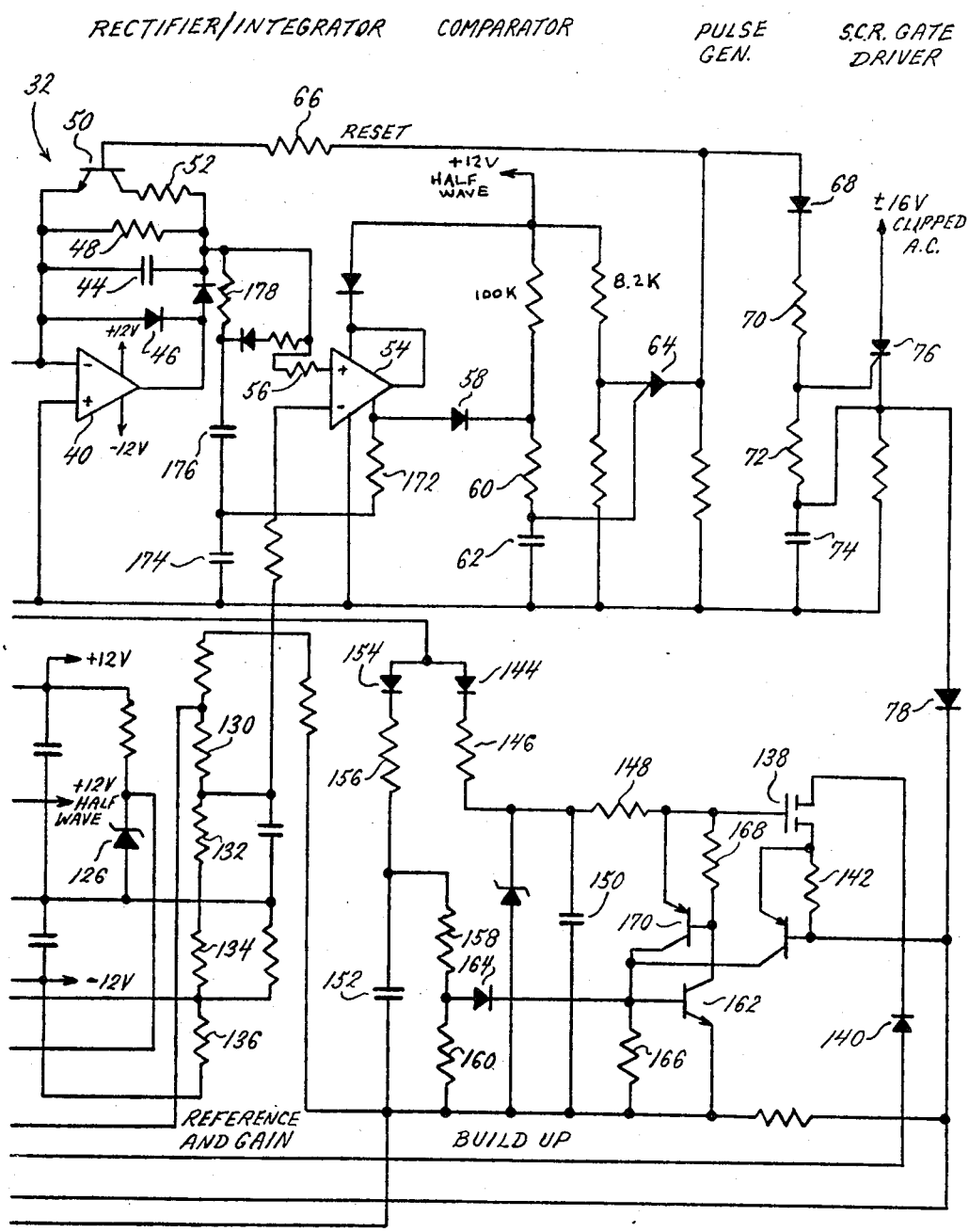

As shown in the drawing, a typical rotating field generator includes an exciter field 20 which energizes an exciter armature 22, the output of which is rectified by a full wave bridge 24 with transient suppressors 26 connected across the output of the bridge 24 along with generator field 28. The generator field 28 induces a voltage in the generator stator 30, as known in the art.

The voltage regulator circuit 32 includes resistors 34, 36 and capacitor 38 which form a voltage divider and summing network connected to output terminals 20, 22 which senses the generator output voltage and reduces it to a single low voltage AC signal for input to the regulator 32. The voltage across capacitor 38 is inversely proportional to the output frequency of the generator so that the regulator 32 will control the generator output voltage at a voltage proportional to its frequency.

The output voltage on capacitor 38 is input to an operational amplifier 40 through capacitor 42. Another capacitor 44 is connected across amplifier 40 and integrates the output of amplifier 40 during the negative half cycle of output voltage. During the positive half cycle of output voltage, diode 46 bypasses amplifier 40. The voltage stored on capacitor 44 discharges relatively slowly through resistor 48 during the positive half cycle of output voltage until reset by transistor 50 and resistor 52, as explained below. Thus, the voltage during the negative half cycle of generator output is input to the negative terminal of operational amplifier 40 and integrated in capacitor 44. During the positive half cycle, this integrated voltage of capacitor 44 decays across resistor 48 until transistor 50 is actuated which connects a resistor 52 in series with capacitor 44 to rapidly dissipate the voltage therein and reset it for the next negative half cycle of generator output.

The slowly decaying voltage of capacitor 44 in input to a differential amplifier 54 through resistor 56. A reference voltage is generated and input to the negative terminal of differential amplifier 54, as explained below. Differential amplifier 54 compares this slowly decaying voltage with the reference voltage and, when it equals the reference voltage, it generates a positive signal through diode 58 to charge capacitor 62 through resistor 60. Unijunction transistor 64 produces a pulse through resistor 66 to actuate transistor 50 and to reset the integrator circuit, and also through diode 68, resistor 70, resistor 72, and capacitor 74 to switch an SCR 76. This SCR 76 conducts a clipped 16 volts AC through diode 78 to the exciter field power supply 80 to control its voltage output, as will be explained below.

In operation, if the output voltage is high, the voltage integrated in capacitor 44 will also be high and as it slowly decays through resistor 48 it will cross the reference voltage late in the positive half cycle and switch the unijunction transistor 64 and SCR 76 late in the positive half cycle and thereby reduce the exciter field voltage accordingly. Conversely, if the output voltage is low, the voltage integrated in capacitor 44 will also be low and will slowly decay to cross the reference voltage earlier in the positive half cycle and switch unijunction transistor 64 and SCR 76 earlier in the positive half cycle to increase the exciter field voltage. Thus, this circuit provides phase angle control for the field exciter voltage supply 80 which is directly responsive to the integrated value of the voltage during the negative half cycle of the generator output voltage. As the circuit is reset each positive half cycle, the circuit operates every half cycle to insure fast response.

The exciter field power supply 80 includes SCR 82 with a gate lead 84 connected to SCR 76 through diode 78. As SCR 82 is switched, it connects the filtered output voltage to the exciter field 20, filtering being provided by inductors 86, 88; capacitors 90, 92 and resistors 94. Additionally, diode 96 provides a path for the inductive energy current flow in the exciter field 20 during the non-conducting period of SCR 82, and circuits 98, 100 limit the rate of rise in voltage across the SCR 82 and diode 96, as known in the art.

The various voltages used by the regulator 32 are generated by a generator output voltage connected through resistors 102, 104 into diodes 106, 108 and capacitors 110, 112. This circuit produces DC voltages through resistors 114, 116 of +12 and −12 volts. Zener diodes 118, 120 regulate this power supply to insure an accurate power supply for the control circuits. The half wave rectified AC is provided by diode 122 and resistor 124 for the comparator circuit comprised of differential amplifier 54, as shown. The reference voltage for comparator and differential 54 is regulated by zener diode 126, and adjusted by potentiometer 128, the output of which is connected across a voltage divider circuit comprised of resistors 130, 132, 134, and 136.

Upon start up of the voltage generator, the output voltages are too low to power the control circuits and the regulator circuit 32. During this start up, smoother and more reliable operation may be obtained by bypassing the regulator circuit 32 until the output voltage builds up to a preselected minimum value. Field effect transistor (FET) 138 provides this function by directly connecting the anode and gate of SCR 82 through diode 140 and resistor 142 so that the residual voltage of the generator stator 30 may be used to directly bias the SCR 82 and switch it on continuously to apply the smaller amounts of voltage during start up directly to the exciter field 20. FET 138 is switched on by generator output voltage conducting through diode 144 and resistor 146 to charge capacitor 150, which gates on FET 138 through resistor 148. As the generator output voltage rises, a second capacitor 152 is charged through a second diode 154 and resistor 156. The voltage across capacitor 152 is divided by resistors 158, 160 which biases transistor 162 on through diode 164 and resistor 166. As transistor 162 turns on, it develops a voltage 168 which switches transistor 170 on. When transistors 160 and 170 are switched on, the voltage from the gate lead of FET 138 is latched to a minimum value which switches it off and disconnects the circuit between the anode and gate terminals of SCR 82 in the exciter field power supply 80. This releases the exciter field power supply 80 for control by the regulator circuit 32, as previously described.

It should be noted that there are other miscellaneous portions of the circuits which provide stability and additional feedback control. For example, resistor 172, capacitor 174, capacitor 176, and resistor 178 provide a negative feedback signal with a time constant set to match the generator time constant to stablize the regulator circuit 30 and insure rapid response without overshoot or hunting. Additionally, current transformer 180 senses the line current and develops a voltage across potentiometer 182 which is input to resistor 184 through resistor 186 to adjust the voltage input to the integrator operational amplifier 40.

The polarities are such that the phase relationship of the voltage across capacitor 38 is in phase with the voltage across resistor 184 when the current in the generator is at a zero lagging power factor. The values of resistor 184 and capacitor 38 are chosen such that the voltage across 184 is approximately five percent of that of capacitor 38. This makes the voltage to the regulator circuit 32 adjustable from 100% to ninety-five percent depending upon the power factor at the generator output.

There are various changes and modifications which may be made to applicant's invention as would be apparent to those skilled in the art. However, any of these changes or modifications are included in the teaching of applicant's disclosure and he intends that his invention be limited only by the scope of the claims appended hereto.

What is claimed is:

1. A voltage regulator for regulating the output voltage of an A-C generator, said generator having a field, the voltage regulator comprising:
   means to produce a voltage to excite the field,
   means to sense the A-C generator output voltage,
   means to integrate one-half cycle of the A-C generator voltage output,
   means to generate a reference voltage,
   means to compare said integrated voltage with the reference voltage,
   means to enable said comparator means at the end of the one-half cycle during which said integration means integrates the output voltage, and
   means to regulate the field exciter voltage producing means in response to said voltage comparator means to thereby regulate the field strength and the generator output voltage.

2. The circuit of claim 1 further comprising means to reset the integrator means every cycle of the output voltage.

3. The circuit of claim 1 wherein the integrator means comprises a capacitor and an operational amplifier, the capacitor being connected across the operational amplifier to integrate the output voltage.

4. The circuit of claim 2 wherein the reset means comprises a first electronic switch means connected to the output of the comparator means, and in circuit with the integrator means to reset same.

5. The circuit of claim 4 wherein the first electronic switch means includes a unijunction transistor, and a first transistor, said first transistor completing a circuit across the integrator means in response to the first unijunction transistor.

6. The circuit of claim 1 wherein the producing means regulating means comprises an electronic switch means.

7. The circuit of claim 6 wherein the electronic switch means comprises a first SCR, and the field voltage producing means comprises a second SCR, the gate lead of the second SCR being in circuit with the electronic switch means.

8. The circuit of claim 1 further comprising:
a second means to sense the A-C generator output voltage, and
means responsive to said second output voltage sensing means to independently regulate the field exciter voltage producing means.

9. The circuit of claim 8 further comprising means responsive to the second output voltage sensing means to disable the independent regulating means.

10. The circuit of claim 8 wherein the independent regulating means comprises an electronic switch means, the field voltage producing means including an SCR, the electronic switch means having means to place the anode and the gate of said SCR in circuit and thereby turn said SCR on.

11. The circuit of claim 9 wherein the independent regulating means comprises an electronic switch means, and wherein the disabling means comprises a second electronic switch means, the second electronic switch means having means responsive to the second output voltage sensing means to bias off the electronic switch means.

12. The circuit of claim 1 wherein the field voltage producing means includes an SCR, the electronic switch means comprises a FET connected in circuit between the gate and the anode of the SCR, and the second electronic switch means comprises a pair of latching transistors, said latching transistors being connected in circuit with the gate of the FET and having means to latch the FET in a non-conductive state.

13. The circuit of claim 8 wherein the second output voltage sensing means has means to enable the independent regulating means only when the output voltage is below a pre-selected value substantially less than the generator rated output voltage.

14. A voltage regulator for regulating the output voltage of an A-C generator, said generator having a field, a voltage regulator comprising:
means to produce a voltage to excite the field,
means to sense the A-C generator output voltage,
means to integrate one-half cycle of the A-C generator voltage output,
means to generate a reference voltage,
means to compare said integrated voltage with the reference voltage,
means to enable said comparator means at the end of the one-half cycle during which said integration means integrates the output voltage,
means to reset the integrator means every cycle of the output voltage, and
means to regulate the field exciter voltage producing means in response to said voltage comparator means to thereby regulate the field strength and the generator output voltage.

15. The circuit of claim 14 wherein the A-C generator voltage output is integrated directly without being rectified into D-C.

16. The circuit of claim 14 further comprising a second means to sense the A-C generator output voltage, and means responsive to said second output voltage sensing means to independently regulate the field exciter voltage producing means.

17. The circuit of claim 16 further comprising means responsive to the second output voltage sensing means to disable the independent regulating means.

18. The circuit of claim 17 wherein the second output voltage sensing means has means to enable the independent regulating means only when the output voltage is below a preselected value substantially less than the generator rated output voltage.

19. A voltage regulator for regulating the output voltage of an A-C generator, said generator having a field, the voltage regulator comprising:
means to produce a voltage to excite the field,
means to sense the A-C generator output voltage,
means to integrate one-half cycle of the A-C generator output voltage,
means to reset the integrator means every cycle of the output voltage,
means to generate a reference voltage,
means to compare said integrated voltage with the reference voltage, and
means to regulate the field exciter voltage producing means in response to said voltage comparator means to thereby regulate the field strength and a generator output voltage.

* * * * *